(12) United States Patent
Christensen

(10) Patent No.: US 6,872,049 B2
(45) Date of Patent: Mar. 29, 2005

(54) WIND TURBINE COMPRISING A PLANETARY GEAR

(75) Inventor: Mogens Christensen, Tjele (DK)

(73) Assignee: Vestas Wind Systems A/S, Ringkøbing (DK)

( * ) Notice: Subject to any disclaimer, the term of this patent is extended or adjusted under 35 U.S.C. 154(b) by 0 days.

(21) Appl. No.: 10/474,137

(22) PCT Filed: Mar. 14, 2002

(86) PCT No.: PCT/DK02/00171
§ 371 (c)(1),
(2), (4) Date: Oct. 2, 2003

(87) PCT Pub. No.: WO02/079644
PCT Pub. Date: Oct. 10, 2002

(65) Prior Publication Data
US 2004/0105753 A1 Jun. 3, 2004

(30) Foreign Application Priority Data
Apr. 2, 2001 (DK) .................................. 2001 00545

(51) Int. Cl.⁷ ............................................... F03D 11/00
(52) U.S. Cl. .................... 415/124.1; 415/229; 415/908; 416/170 R; 475/348
(58) Field of Search ................... 415/4.3, 4.5, 124.1, 415/229, 908; 416/170 R; 475/219, 253, 348

(56) References Cited
U.S. PATENT DOCUMENTS
6,176,804 B1 * 1/2001 Kekki et al. ................ 475/331
6,459,165 B1 * 10/2002 Schoo ........................ 290/1 C

FOREIGN PATENT DOCUMENTS
DE 2235448 2/1974 ............. F16H/1/48

* cited by examiner

Primary Examiner—Ninh H. Nguyen
(74) Attorney, Agent, or Firm—Donald S. Dowden; Cooper & Dunham LLP

(57) ABSTRACT

A wind turbine with a rotor, a nacelle and a tower. The nacelle comprises a planetary gear (4) with a planetary holder (5), on which the hub (6) of the rotor is rigidly secured, and which can be connected to the shaft of an electric generator. The planetary gear (4) comprises a ring gear (7) fixedly mounted on an engine frame (9) in the nacelle or on the member (8) rigidly connected to said frame. The planetary wheels (17a, 17b) of the planetary gear can run around a centrally arranged sun wheel (14) while engaging the latter. The sun wheel is optionally connected to a parallel gear (30). The planetary holder (5) is rotatably mounted in the ring gear (7) by means of at least two sets (17) of planetary twin wheels (17a, 17b). Each set of planetary twin wheels is mounted on a bogie shaft (19) on the planetary holder. Through an axially rearward collar (23) projecting beyond the ring gear, the planetary holder (5) is also rotatably arranged on the curved outer side (7b) of the ring gear (7) by means of an outer radial-axial-roller bearing (27). As a result, a wind turbine is obtained which is suited for generating very strong power and which is very compact and ensures a very advantageous transfer of the power at each planetary wheel.

10 Claims, 2 Drawing Sheets

WIND TURBINE COMPRISING A PLANETARY GEAR

TECHNICAL FIELD

The invention relates to a wind turbine with a rotor, a nacelle and a tower, and where the nacelle comprises a planetary gear with a planetary holder on which the hub of the rotor is rigidly connected, said planetary holder being connected or connectable to the shaft of an electric generator, and where the planetary gear comprises a ring gear fixedly mounted on an engine frame in the nacelle or on a member rigidly connected to said frame, and where the planetary wheels of the planetary gear can run around a centrally arranged sun wheel, said planetary wheels engaging said sun wheel which is optionally connected to a parallel gear.

BACKGROUND ART

Such a wind turbine with a rotor, a nacelle and a tower is known, where the hub of the rotor is rigidly secured to the planetary holder of a planetary gear and not to a main shaft which is the conventional mounting. A ring gear for the planetary gear is fixedly mounted inside a tubular member of the known wind turbine, said tubular member being rigidly connected to the engine frame. The planetary wheels of the planetary holder co-operate through their teeth with the inner gear portion of the ring gear, said planetary holder being rotatably arranged inside the tubular member by means of a radial-axial-roller bearing and a ball bearing arranged on their respective sides of the ring gear. As the planetary wheels are of a simple and wide structure, and as the bearings are rather rigid, a considerable risk applies of the rotor breaking down in case the forces on the planetary holder are instantaneously very heavy. Such a structure is not completely satisfactory with respect to wind turbines generating a very strong power.

BRIEF DESCRIPTIONS OF THE INVENTION

The object of the invention is to provide a wind turbine of the above type which is suited for wind turbines generating a very strong power and which is very compact while ensuring that the bearing of the planetary holder possesses a predetermined resilience.

The wind turbine according to the invention is characterised in that the planetary holder is rotatably mounted on the ring gear by means of at least two sets of planetary twin wheels, whereby each set of planetary twin wheels is rotatably mounted on a bogie shaft on the planetary holder, and that said planetary holder is rotatably arranged on the curved outer side of the ring gear by means of an outer radial-axial-roller bearing and through an axially rearwardly directed collar projecting radially beyond said ring gear. As a result, a very compact structure is obtained, and the planetary holder can yield slightly at each planetary wheel of each set of planetary wheels in case it is subjected to heavy stresses on the rotor, said rotor being mounted on said planetary holder.

According to the invention, each planetary wheel of each set of planetary twin wheels may be mounted on the bogie shaft by means of a double spherical roller bearing, preferably a radial-axial-roller bearing, the rollers of which can run in a common spherical track in an outer race of the bearing. As a result, particularly good possibilities are obtained of both planetary wheels of each set of planetary wheels being able to carry out very weak lateral inclinations in such a manner that it is ensured that the stresses transferred through the teeth of the planetary wheels are always uniformly distributed across the entire tooth width.

Furthermore, the outer radial-axial-roller bearing of the planetary holder may according to the invention be arranged substantially radially opposite the bogies of the planetary holder, which turned out to be a particularly advantageous structure.

According to the invention, the bogie shaft of the planetary wheels of each set of planetary twin wheels may be supported by a resilient carrier plate mounted on the planetary holder and separating the planetary wheels of the set of planetary wheels. In this manner an efficient support of the individual planetary wheels is obtained, also when very heavy forces and moments of force apply to the planetary holder.

Moreover, an auxiliary planetary gear may according to the invention be provided behind the planetary gear and built therein for increasing the ratio of the number of revolutions of the electric generator to the number of revolutions of the rotor hub. As mentioned, it is thus possible to increase this ratio.

According to the invention, the rotor hub may be secured to the planetary holder by being bolted onto the collar of said planetary holder, said bolts also extending into an outer race in the outer radial-axial-roller bearing, whereby a particularly reliable securing of the rotor is obtained.

According to the invention, the outer race in the outer radial-axial-roller bearing of the planetary holder may be provided with a radially inward, circumferential projection with two frustoconical surfaces facing partially away from one another and forming the outer tracks for the rollers of the bearing, whereas an inner race in said bearing may be provided with a corresponding circumferential depression with two frustoconical surfaces partially facing one another and also forming tracks for the bearing rollers. In this manner the radial-axial-roller bearing operates in a particularly reliable manner.

Furthermore according to the invention, the planetary holder may be substantially pot-shaped and be provided with at least two inner axially directed projections, the carrier plate being secured to said projections for instance by being squeezed in a track in said projection by means of an end plate screwed onto said projection. In this manner the carrier plate is secured in a particularly efficient and simple manner.

According to the invention the outer radial-axial-roller bearing may be mounted just behind an outer end collar on the ring gear with the result that the bearing of the planetary holder at the outer side of the ring gear is strengthened.

Finally, each planetary wheel may according to the invention advantageously be of a width of 0.35 to 0.45 times the width of the bogie.

BRIEF DESCRIPTION OF THE DRAWING

The invention is explained in detail below with reference to the drawing, in which.

BEST MODE FOR CARRYING OUT THE INVENTION

Figure 1:
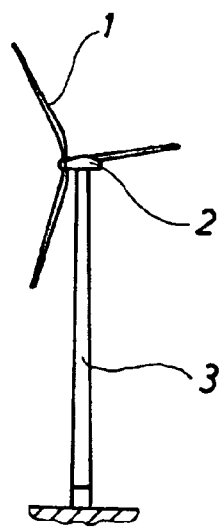
FIG. 1 illustrates a wind turbine according to the invention.
Figure 2:
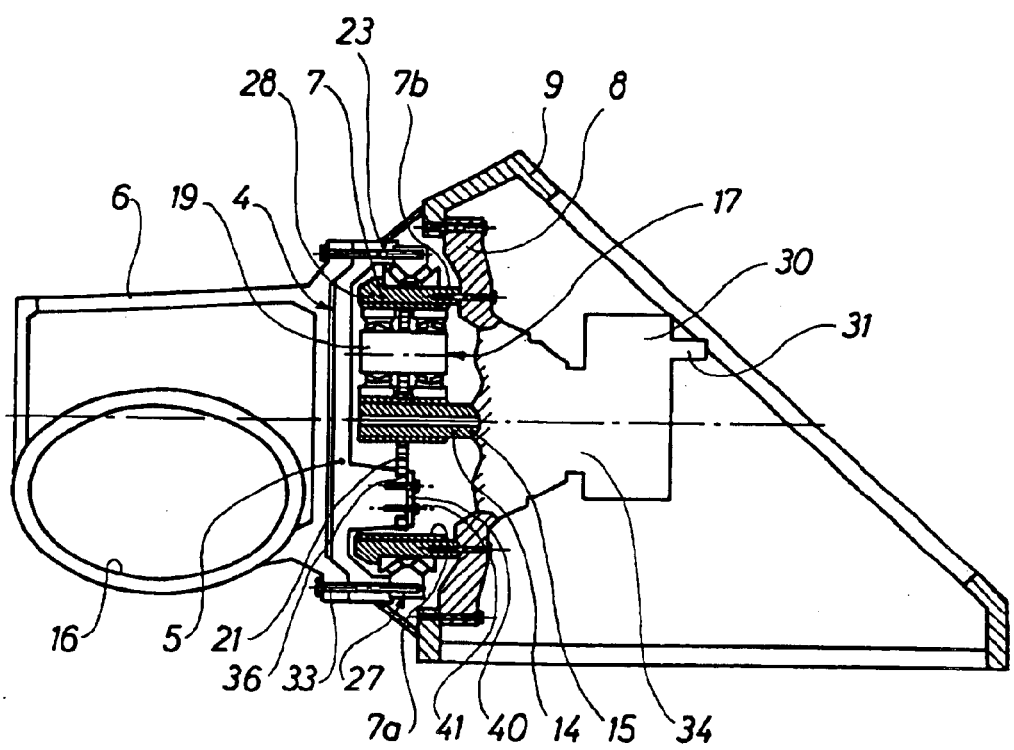
FIG. 2 is a diagrammatic view of a portion of the nacelle, and it appears how the rotor hub of the wind turbine is connected to the planetary gear of said wind turbine, a longitudinal sectional view through the nacelle showing said planetary gear and the adjacent portions.
Figure 3:
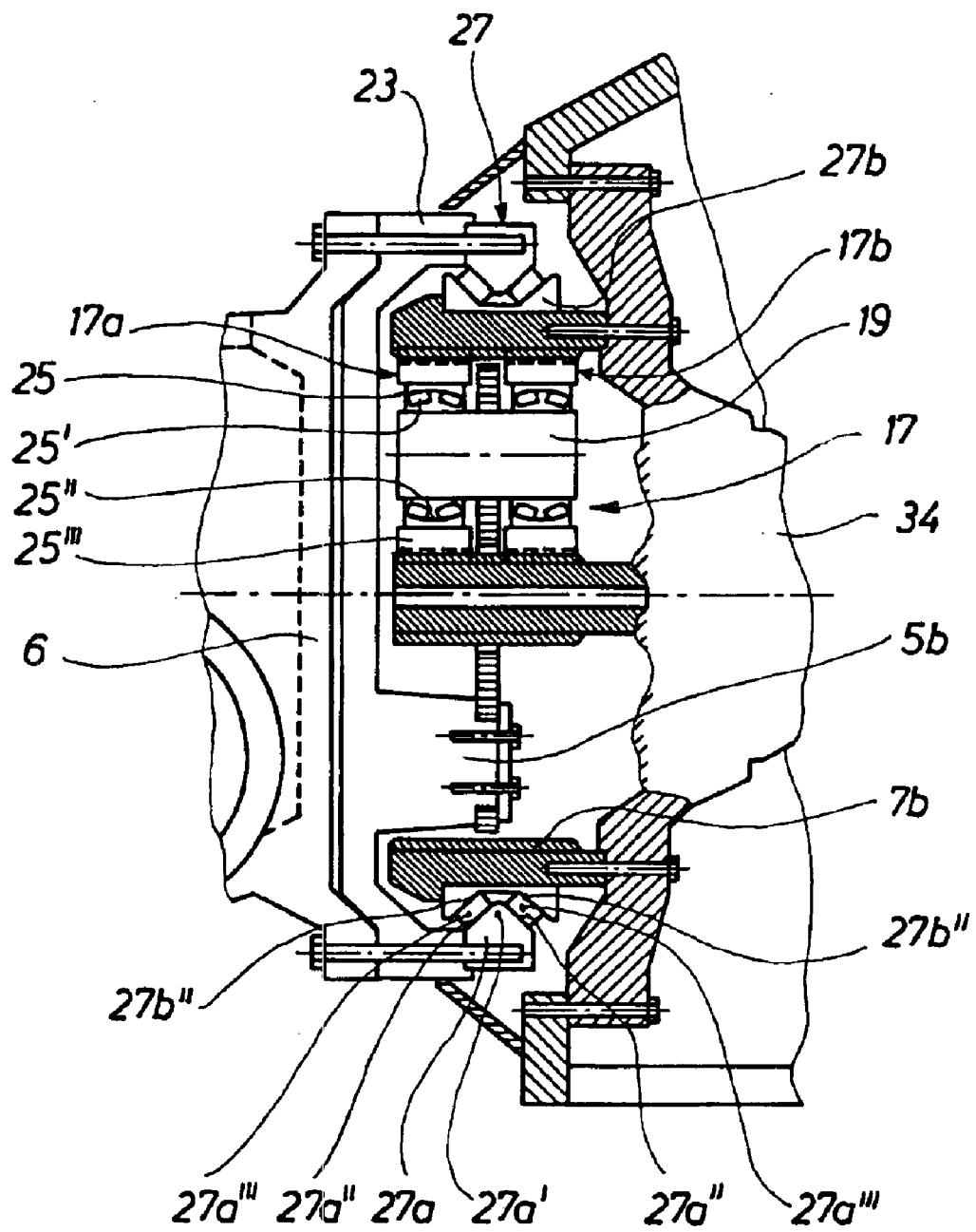
FIG. 3 shows the central portion of FIG. 2 on a larger scale.

The wind turbine shown in FIG. 1 comprises a rotor 1, a nacelle 2 and a tower 3. As illustrated in FIGS. 2 and 3, the nacelle 2 comprises a planetary gear 4, and the hub 6 of the rotor 1 is rigidly secured to the planetary holder 5 of said planetary gear 4. The planetary gear 4 is connected or connectable to the shaft of an electric generator not shown. The planetary gear 4 comprises a ring gear 7 provided with a toothing 7a on the side turning radially inwards. The ring gear 7 is fixedly mounted on a housing part 8, which in turn is rigidly connected to an engine frame 9 in the nacelle. The ring gear 7 can optionally be secured directly to the engine frame 9. The planetary gear 4 comprises planetary wheels 17 engaging a centrally arranged sun wheel 14 which comprises a tubular extension 15. A parallel gear 30 can be inserted between the tubular extension and the generator shaft not shown, said parallel gear being diagrammatically indicated. The output shaft of the parallel gear is indicated at 31. The hub 6 comprises three openings 16, only one opening being shown, and the blades of the rotor can be secured in these openings. The planetary holder is rotatably mounted in the ring gear 7 by means of the above planetary wheels. The planetary wheels are provided in form of at least two sets of planetary wheels, where one set of planetary twin wheels 17 comprises the planetary wheels 17a and 17b. The second set of planetary twin wheels is identical with the first set of planetary twin wheels and does not appear from the Figure. Each set of planetary twin wheels 17 is mounted in a bogie on a bogie shaft 19, which can be secured to a carrier plate 21 rigidly connected to the planetary holder 5. The planetary holder is furthermore rotatably arranged on the curved outer side 7b of the ring gear 7 by means of an outer radial-axial-roller bearing 27. This radial-axial-roller bearing 27 is mounted between the above outer side 7b and an axially rearward collar 23 on the planetary holder 5, said collar projecting radially beyond the ring gear 7.

As illustrated, each planetary wheel 17a or 17b of each set of planetary twin wheels can be mounted on the bogie shaft 19 by means of a double spherical roller bearing 25.

This roller bearing 25 is preferably a radial-axial-roller bearing, the rollers 25' of which can run on a common spherical track 25", cf. FIG. 3, on an outer race 25''' in the bearing. The above statements on the planetary wheel 17a also applies to the planetary wheel 17b and possible further planetary wheels in the planetary gear.

As shown, the radial-axial-roller bearing 27 of the planetary holder collar 23 can be placed at a location on the outer surface 7a of the ring gear, said location opposing the bogies of the planetary holder 5, a bogie being formed by a bogie shaft with a set of planetary twin wheels.

The carrier plate 21 can be slightly resilient, and as shown the planetary wheels 17a and 17b of each bogie can be separated by means of the plate 21, said planetary wheels being arranged on their respective sides of said plate 21.

An auxiliary planetary gear 34 can be mounted behind and in connection with the planetary gear 4, the housing of said auxiliary planetary gear 34 being indicated. This auxiliary planetary gear serves to increase the ratio of the number of revolutions of the shaft of the electric generator not shown to the number of revolutions of the hub 6 of the rotor.

The rotor hub 6 can be secured to the planetary holder 5 by being bolted onto the collar 23 of the latter by means of a plurality of bolts 33 which also extend into an outer race 27a in the outer radial-axial-roller bearing 27. The outer race 27a in this bearing can comprise a radially inward, circumferential projection 27a' with two frustoconical surfaces facing partially away from one another and forming the outer tracks 27a" for the rollers 27a''' of the bearing, whereas an inner race 27b in said bearing comprises a corresponding circumferential depression with two frustoconical surfaces partially facing one another and also forming tracks 27b" for the bearing rollers 27a'''.

The planetary holder 5 can be substantially pot-shaped and be provided with at least two inner axially directed projections 5b. The carrier plate 21 can be secured on these axially directed projection for instance by being squeezed in a track 36 in the projection by means of an end plate 40 screwed thereon by means of of bolts 41.

Should the wind turbine be subjected to particularly heavy wind forces while in use, the carrier plate 21 and the planetary twin wheels 17a and 17b can yield slightly, whereby said carrier plate can be slightly resiliently deformed and the rollers 25' in the bearings of the planetary wheels can move slightly on the spherical tracks 25" as the bogie shaft 19 is slightly turned. As a result, the forces transferred through the planetary wheels are pressure loads being uniformly distributed across each tooth at the engaging locations.

The invention may be modified in many ways without thereby deviating from the scope of the invention.

What is claimed is:

1. A wind turbine with a rotor (1), a nacelle (2) and a tower (3), and where the nacelle comprises a planetary gear (4) with a planetary holder (5), on which the hub (6) of the rotor is rigidly connected, said planetary holder being connected or connectable to the shaft of an electric generator, and where the planetary gear (4) comprises a ring gear (7) fixedly mounted on an engine frame (9) in the nacelle or on a member (8) rigidly connected to said frame, and where the planetary wheels (14) of the planetary gear can run around a centrally arranged sun wheel (14), said planetary wheels engaging said sun wheel (14) which is optionally connected to a parallel gear (30), characterised in that the planetary holder (5) is rotatably mounted in the ring gear (7) by means of at least two sets (17) of planetary twin wheels (17a, 17b), whereby each set of planetary twin wheels is rotatably mounted on a bogie shaft (19) on the planetary holder, and that said planetary holder (5) is rotatably arranged on the curved outer side (7b) of the ring gear (7) by means of an outer radial-axial-roller bearing (28) and through an axially rearwardly directed collar (23) projecting radially beyond said ring gear.

2. A wind turbine as claimed in claim 1, characterised in that each planetary wheel of each set of planetary twin wheels is mounted on the bogie shaft (19) by means of a double spherical roller bearing (25), preferably a radial-axial-roller bearing, the rollers (25') of which can run in a common spherical track (25") in an outer race (25''') of the bearing.

3. A wind turbine as claimed in claim 1, characterised in that the outer radial-axial-roller bearing (27) of the planetary holder (23) is arranged substantially radially opposite the bogies (19) of the planetary holder (5).

4. A wind turbine as claimed in claim 1, characterised in that the bogie shaft (19) for the planetary wheels (17a, 17b) of each set of planetary twin wheels is supported by a resilient carrier plate (21), which is mounted on the planetary holder (85) and which separates the planetary wheels (17a, 17b) of the set of planetary wheels.

5. A wind turbine as claimed in claim 1, characterised in that an auxiliary planetary gear (34) is provided behind and in connection with the planetary gear (4), said auxiliary planetary gear (34) increasing the ratio of the number of revolutions of the electric generator to the number of revolutions of the rotor hub (6).

6. A wind turbine as claimed in claim 1, characterised in that the rotor hub (6) is secured to the planetary holder (5) by being bolted (33) onto the collar (23) of said planetary holder, said bolts also extending into an outer race (27*a*) in the outer radial-axial-roller bearing (27).

7. A wind turbine as claimed in claim 1, characterised in that the outer race (27*a*) in the outer radial-axial-roller bearing (27) of the planetary holder (5) comprises a radially inward, circumferential projection (27*a*') with two frustoconical surfaces (27*a*") facing partially away from one another and forming the outer tracks for the rollers (27*a*''') of the bearing, whereas an inner race (27*b*) in said bearing is provided with a corresponding circumferential depression with two frustoconical surfaces partially facing one another and also forming tracks (27*b*") for the bearing rollers (27*a*''').

8. A wind turbine as claimed in claim 1, characterised in that the planetary holder (5) is substantially pot-shaped and provided with at least two inner axially directed projections (5*b*), the carrier plate (21) being secured to said projections for instance by being squeezed in a track (36) in said projection (5*b*) by means of an end plate (40) screwed (41) onto said projection.

9. A wind turbine as claimed in claim 1, characterised in that the outer radial-axial-roller bearing (27) is mounted just behind an outer end collar (28) on the ring gear (7).

10. A wind turbine as claimed in claim 1, characterised in that each planetary wheel is of a width of 0.35 to 0.45 times the width of the bogie.

* * * * *

UNITED STATES PATENT AND TRADEMARK OFFICE
CERTIFICATE OF CORRECTION

PATENT NO.        : 6,872,049 B2
APPLICATION NO. : 10/474137
DATED             : March 29, 2005
INVENTOR(S)       : Mogens Christensen Page 1 of 1

It is certified that error appears in the above-identified patent and that said Letters Patent is hereby corrected as shown below:

In claim 1, in column 4 of the patent, line 31, "said planetary holder" should read --said planetary gear--.

Signed and Sealed this

First Day of January, 2008

JON W. DUDAS
*Director of the United States Patent and Trademark Office*